(12) United States Patent
Mishra et al.

(10) Patent No.: US 12,199,805 B2
(45) Date of Patent: Jan. 14, 2025

(54) SYSTEM AND METHOD FOR DEMODULATION AND DECODING A DATA BODY OF A POWER LINE COMMUNICATION

(71) Applicant: Bendix Commercial Vehicle Systems LLC, Avon, OH (US)

(72) Inventors: Akshay Mishra, Kanpur (IN); Amit Babalal Nahar, Pune (IN); Pratima Vishwakarma, Pune (IN); Dattatray Jadhav, Aurangabad (IN)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 41 days.

(21) Appl. No.: 18/336,109

(22) Filed: Jun. 16, 2023

(65) Prior Publication Data

US 2024/0422041 A1     Dec. 19, 2024

(51) Int. Cl.
*H04L 27/26* (2006.01)
*H04L 7/00* (2006.01)
*H04L 7/033* (2006.01)

(52) U.S. Cl.
CPC ........ *H04L 27/2614* (2013.01); *H04L 7/0087* (2013.01); *H04L 7/0334* (2013.01)

(58) Field of Classification Search
CPC .. H04L 7/0087; H04L 7/0334; H04L 27/2614
USPC .......................................................... 375/130
See application file for complete search history.

(56) References Cited

U.S. PATENT DOCUMENTS

| | | | |
|---|---|---|---|
| 5,278,862 A | 1/1994 | Vander Mey | |
| 5,504,774 A | 4/1996 | Takai et al. | |
| 2006/0181283 A1* | 8/2006 | Wajcer | H04B 3/46 324/539 |
| 2007/0285822 A1* | 12/2007 | Lau | G11B 5/59655 |
| 2015/0249480 A1 | 9/2015 | Hiscock | |

\* cited by examiner

*Primary Examiner* — Leila Malek
(74) *Attorney, Agent, or Firm* — Reising Ethington P.C.

(57) ABSTRACT

A system for demodulating and decoding a data body in a message transmitted along a vehicle power line is provided. First and second logic symbols in the data body include distinctive positive and negative peaks, respectively, assuming maximum positive and negative amplitudes for the data body. A peak detector circuit receives the data body and generates a peak indicator signal indicating each time the data body reaches a positive or negative peak having an amplitude equal to or greater than the previous largest positive or negative amplitude in the data body. A sampling circuit generates a data signal responsive to the peak indicator signal. The sampling circuit ignores portions of the peak indicator signal occurring prior to an indication of one of the distinctive positive and negative peaks and the data signal assumes values indicative of the distinctive positive and negative peaks in the peak indicator signal.

20 Claims, 5 Drawing Sheets

SYSTEM AND METHOD FOR DEMODULATION AND DECODING A DATA BODY OF A POWER LINE COMMUNICATION

BACKGROUND OF THE INVENTION a. Field of the Invention

This invention relates to communications systems used in vehicles such as tractor-trailers. In particular, the invention relates to a system and method for demodulating and decoding the data body of received messages transmitted along a power line within a vehicle.

b. Background Art

Power line communication (PLC) is a communication method in which data is transmitted over wires that are also used to deliver electric power. The data is encoded within a signal that is transmitted over the wires in frequency ranges outside of those used to transmit electric power. PLC is advantageous relative to other communication methods because it enables communication using existing wiring. Tractor-trailers frequently employ PLC to exchange messages between members of the tractor-trailer including, for example, sensor readings from vehicle systems including anti-lock braking systems, collision avoidance systems, tire pressure monitoring systems and other vehicle systems as well as commands used to control anti-lock braking systems, lighting systems and other vehicle systems.

Tractor-trailers that implement PLC typically employ transceivers to interface between the vehicle power line and microprocessors and other electronic control systems used in the vehicle. The transceiver commonly used in the industry is a proprietary integrated circuit offered for sale by Qualcomm Atheros, Inc. under the name "SSC P485 PL Transceiver IC" that is intended to implement a communications protocol developed by the Society of Automotive Engineers (SAE) set forth in a document number J2497 and titled "Power Line Carrier Communications for Commercial Vehicles." The supply of the P485 chip is limited, however, and the P485 chip is relatively expensive.

The inventors herein have recognized a need for a system and method for demodulating and decoding the data body of received messages transmitted along a power line within a vehicle that will minimize and/or eliminate one or more of the above-identified deficiencies.

BRIEF SUMMARY OF THE INVENTION

This invention relates to communications systems used in vehicles such as tractor-trailers. In particular, the invention relates to a system and method for demodulating and decoding the data body of received messages transmitted along a power line within a vehicle.

One embodiment of a system for demodulating and decoding a data body in a message transmitted along a power line within a vehicle includes a peak detector circuit. The peak detector circuit is configured to receive the data body in the message from the power line. The data body includes first and second logic symbols. Each of the first and second logic symbols varies in amplitude between a start of the logic symbol and an end of the logic symbol. The first logic symbol includes a distinctive positive peak assuming a maximum positive amplitude for the data body. The second logic symbol includes a distinctive negative peak assuming a maximum negative amplitude for the data body. The peak detector circuit is further configured to generate a peak indicator signal that assumes a first value each time the data body defines a positive peak having a positive amplitude equal to or greater than a previously identified largest positive amplitude in the data body and a second value each time the data body defines a negative peak having a negative amplitude equal to or greater than a previously identified largest negative amplitude in the data body. The system further includes a sampling circuit configured to generate a data signal responsive to the peak indicator signal. The sampling circuit ignores portions of the peak indicator signal occurring prior to an indication in the peak indicator signal of one of the distinctive positive peak and the distinctive negative peak. The data signal assumes a first value each time the peak indicator signal indicates a distinctive positive peak and a second value each time the peak indicator signal indicates a distinctive negative peak.

One embodiment of a method for demodulating and decoding a data body in a message transmitted along a power line within a vehicle includes receiving the data body in the message from the power line. The data body includes first and second logic symbols. Each of the first and second logic symbols varies in amplitude between a start of the logic symbol and an end of the logic symbol. The first logic symbol includes a distinctive positive peak assuming a maximum positive amplitude for the data body and the second logic symbol includes a distinctive negative peak assuming a maximum negative amplitude for the data body. The method further includes generating a peak indicator signal that assumes a first value each time the data body defines a positive peak having a positive amplitude equal to or greater than a previously identified largest positive amplitude in the data body and a second value each time the data body defines a negative peak having a negative amplitude equal to or greater than a previously identified largest negative amplitude in the data body. The method further includes generating a data signal responsive to the peak indicator signal while ignoring portions of the peak indicator signal occurring prior to an indication in the peak indicator signal of one of the distinctive positive peak and the distinctive negative peak. The data signal assumes a first value each time the peak indicator signal indicates a distinctive positive peak and a second value each time the peak indicator signal indicates a distinctive negative peak.

A system and method for demodulating and decoding the data body in a message transmitted along a power line within a vehicle in accordance the present teachings represent an improvement as compared to conventional systems and methods. In particular, the system and method disclosed herein enable a vehicle to receive messages along the power line without use of the typical transceiver used within the industry that is in short supply and relatively expensive. The system and method further allow demodulation and decoding of the data body independent of the duration of the preamble of the message, variations in the voltage range of the signal conveying the message and phase changes in the signal conveying the message.

The foregoing and other aspects, features, details, utilities, and advantages of the present invention will be apparent from reading the following description and claims, and from reviewing the accompanying drawings.

DETAILED DESCRIPTION OF THE INVENTION

Figure 1:
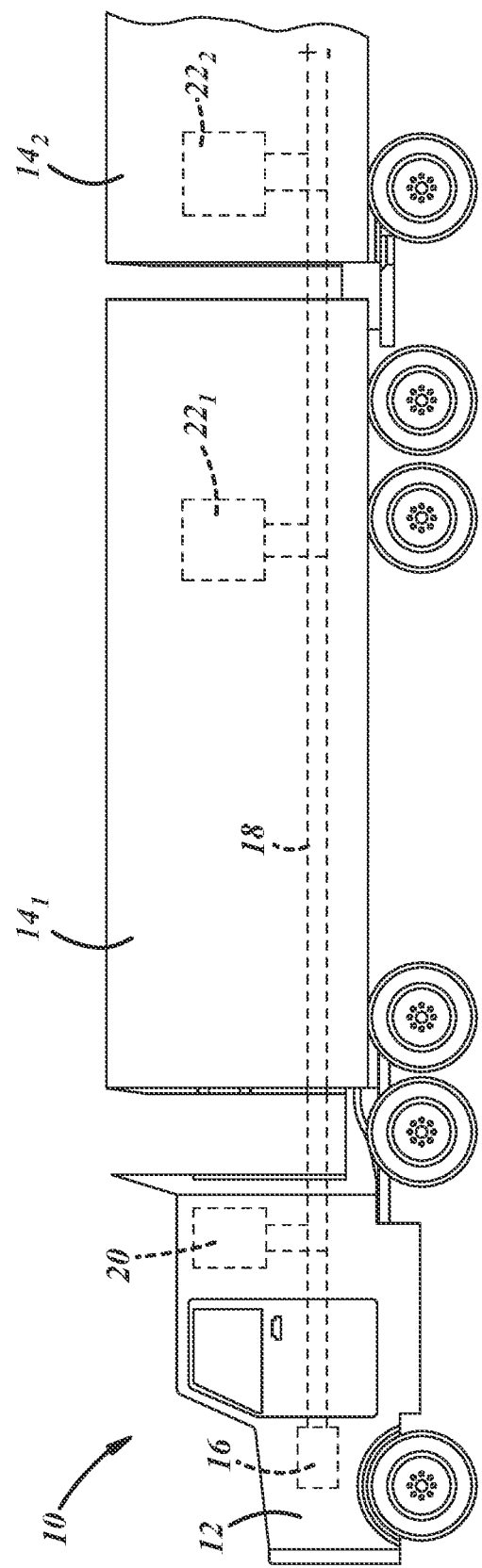
FIG. 1 is a diagrammatic view of a vehicle including a plurality of electronic systems communicating along a power line in the vehicle.

Referring now to the drawings wherein like reference numerals are used to identify identical components in the various views, FIG. 1 illustrates a tractor-trailer 10. Tractor-trailer 10 (also referred to as a semi) contains a truck or tractor 12 and one or more trailers $14_1 \ldots 14_N$. Tractor 12 contains a power unit, such as an internal combustion engine, and steering and drive axles. Tractor 12 also contains a battery 16 for use in starting the power unit and in providing power to various accessory systems. Trailers $14_1 \ldots 14_N$ are provided to store freight and are detachably coupled to tractor 12. Although a pair of trailers 14 are shown in the illustrated embodiment, it should be understood that the number of trailers 14 attached to tractor 12 may vary.

Tractor 12 and trailers 14 may include various fluid and power lines that extend between tractor 12 and trailers 14 including power line 18. The fluid and power lines allow delivery of fluids and electrical power from tractor 12 to trailers 14 for use in, for example, tire pressure management, braking, and activation of tail lights on trailer 14. Power line 18 also forms part of a network used to transmit communications between various electronic systems 20, $22_1 \ldots 22_N$ on tractor 12 and trailers 14, respectively. Systems 20, 22 may comprise any of a wide variety of systems commonly employed on tractor-trailer 10 including, for example, anti-lock braking systems, collision avoidance systems, tire pressure monitoring and control systems, trailer load monitoring systems, and lighting systems. Power line 18 may enable transmission of data from one or more systems 22 on trailers 14 to a system 20 on tractor 12 including, for example, sensor readings indicative of the operation of an anti-lock braking system, the location of surrounding vehicles and infrastructure, pressure within the tires on a trailer 14, or a shift in the load carried by a trailer 14. Power line 18 may also enable transmission of commands and data from tractor 12 to trailers 14 for use in controlling elements of an anti-lock braking system, tire pressure control system or lighting system on one or more of trailers 14.

Figures 2A, 2B, 2C:
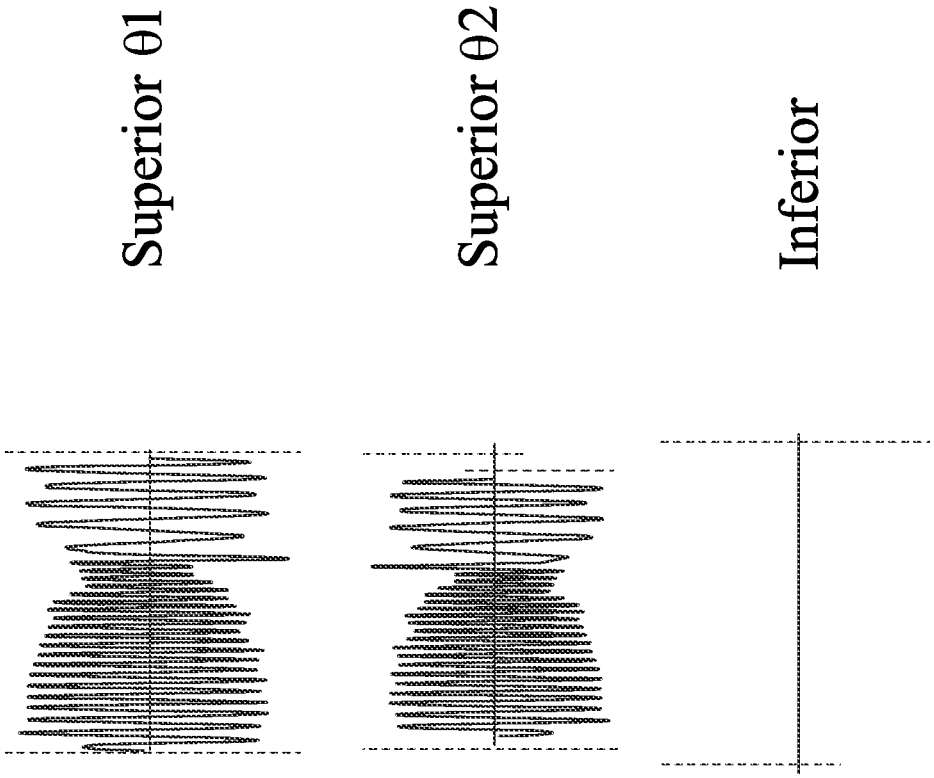
FIGS. 2A-2C are waveform diagrams illustrating logic symbols from a communication protocol used to encode messages transmitted along the power line of the vehicle.

Messages containing data and/or commands may be transmitted along power line 18 between systems 20, 22 using the communications protocol developed by the Society of Automotive Engineers (SAE) and set forth in the document number J2497 and titled "Power Line Carrier Communications for Commercial Vehicles." In accordance with this protocol, messages may be encoded using chirp spread spectrum (CSS) modulation. In particular, a chirp generator will generate specific waveforms corresponding to pre-defined logic symbols that may be interpreted as one of two binary states. Referring to FIG. 2A-2C, the generator may be configured to generate two waveforms that are one hundred and eighty (180) degrees out of phase, but that are otherwise identical. These waveforms correspond to logic symbols Superiorθ1 (FIG. 2A) and Superiorθ2 (FIG. 2B). The absence of any waveform further corresponds to a logic symbol Inferior (FIG. 2C). Messages transmitted under the protocol include a preamble that is encoded through amplitude shift key (ASK) modulation using the Superiorθ2 and Inferior symbols and a data body that is encoded through phase reversal key (PRK) modulation using the Superiorθ1 and Superiorθ2 symbols. In particular, the preamble begins with less than two complete Superiorθ2 symbols, followed by a start bit consisting of the Superiorθ2 symbol, eight data bits with each data bit consisting of a Superiorθ2 or Inferior symbol, and a stop bit consisting of an Inferior symbol. The data body begins with a sync segment comprising five Superiorθ1 symbols, followed by one or more character segments each having a start bit consisting of a Superiorθ2 symbol, eight data bits with each data bit consisting of Superiorθ1 or Superiorθ2 symbol, a stop bit consisting of a Superiorθ1 symbol and a gap of between zero and four Superiorθ1 symbols, followed by an end of message segment consisting of five Superiorθ1 symbols.

Figure 3:
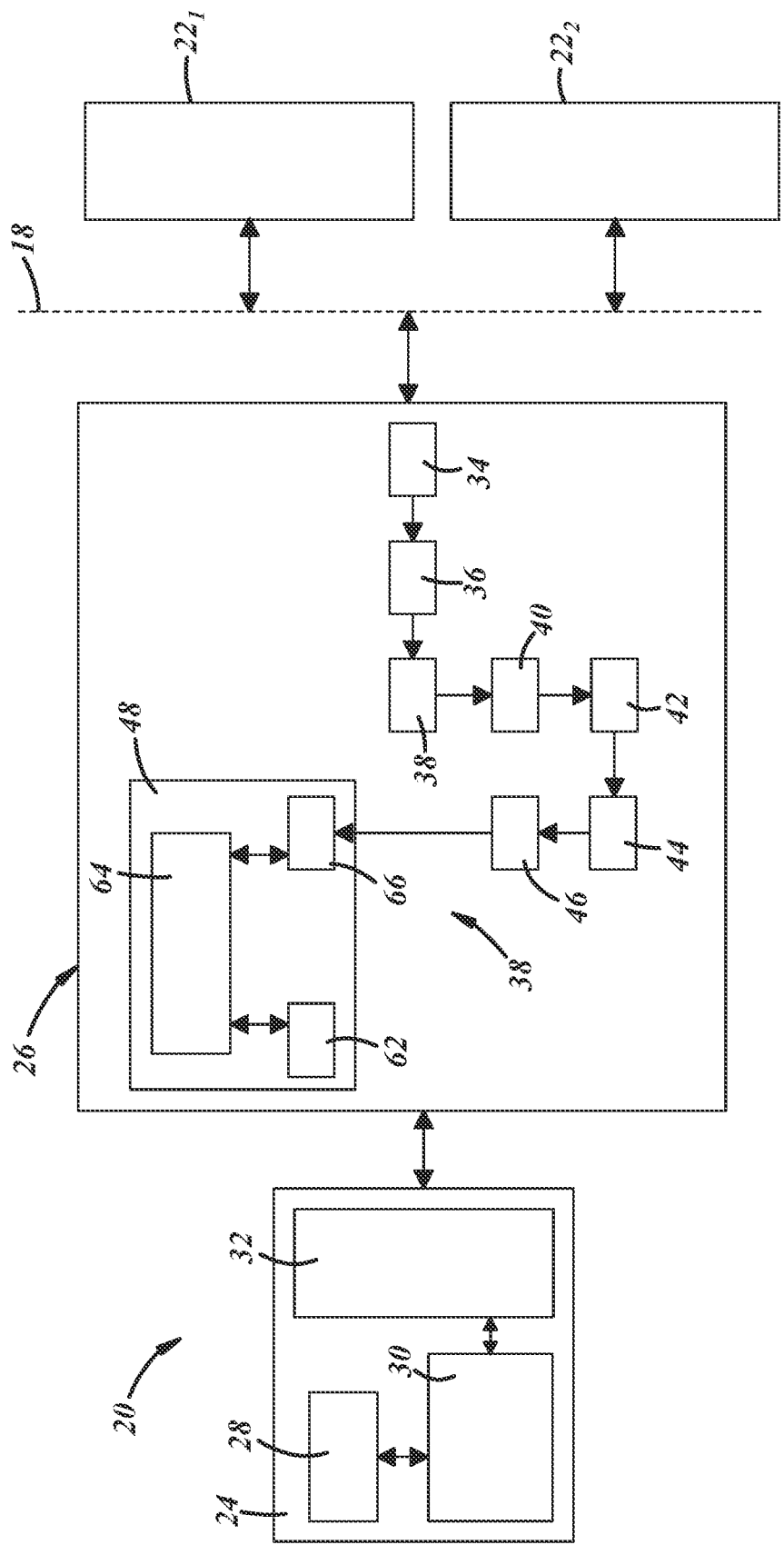
FIG. 3 is a diagrammatic view of the electronic systems of the vehicle of FIG. 1 in which one of the systems includes one embodiment of a system for demodulating and decoding the data body in a message transmitted along the power line within the vehicle.

Referring now to FIG. 3, each system 20, 22 may include a controller 24 and a system 26 for demodulating and decoding the data body in a message transmitted along the power line 18 in vehicle 10 in accordance with the teachings disclosed herein. Although not illustrated herein, it should be understood that each of systems 20, 22 may further include a system for demodulating and decoding the preamble in a message transmitted along the power line 18 and a system for encoding and modulating messages for transmission along power line 18 to other systems 20, 22.

Controller 24 may perform a variety of actions in response to received messages depending on the purpose of the system 20, 22 in which controller 24 and system 26 are employed. Controller 24 may comprise a programmable microprocessor or microcontroller or may comprise an application specific integrated circuit (ASIC). Controller 24 may include a memory 28 and a central processing unit (CPU) 30. Controller 24 may also include an input/output (I/O) interface 32 including a plurality of input/output pins or terminals through which controller 24 may receive a plurality of input signals and transmit a plurality of output signals. The input signals may include signals received from system 26 while the output signals may include signals transmitted to system 26 as well as a system (not shown) for encoding and modulating messages for transmission along power line 18 to other systems 20, 22. In the illustrated embodiment, a single controller 24 is shown. It should be understood, however, that the functionality of controller 24 described herein may be divided among multiple sub-controllers.

System 26 is provided to demodulate and decode the data body in messages received by the system 20 or 22 that has been transmitted by other systems 20 or 22 along the power line 18 in vehicle 10. System 26 implements phase reversal keying (PRK) demodulation of the message data body to demodulate the Superiorθ1 and Superiorθ2 logic symbols to bits of logic one and logic zero, respectively. System 26 may include a decoupling circuit 34, a filter 36, an amplifier 38, a peak detector circuit 40, a sampling circuit 42, a comparator 44, a rectifier 46 and a controller 48. Decoupling circuit 34 prevents unwanted energy from power line 18 from being passed to other elements of system 26. Circuit 34 may include a capacitor that couples the remaining elements of system 26 to power line 18 and a clamping diode (e.g., a Zener diode) downstream of the capacitor.

Filter 36 attenuates analog input signals outside of a predetermined frequency range (e.g., 100 KHz to 400 KHz). Filter 36 may comprise a band pass filter.

Amplifier 38 amplifies the analog signal output by filter 36 prior to delivery to peak detection circuit 40. Amplifier 38 is conventional in the art.

Figure 4A:
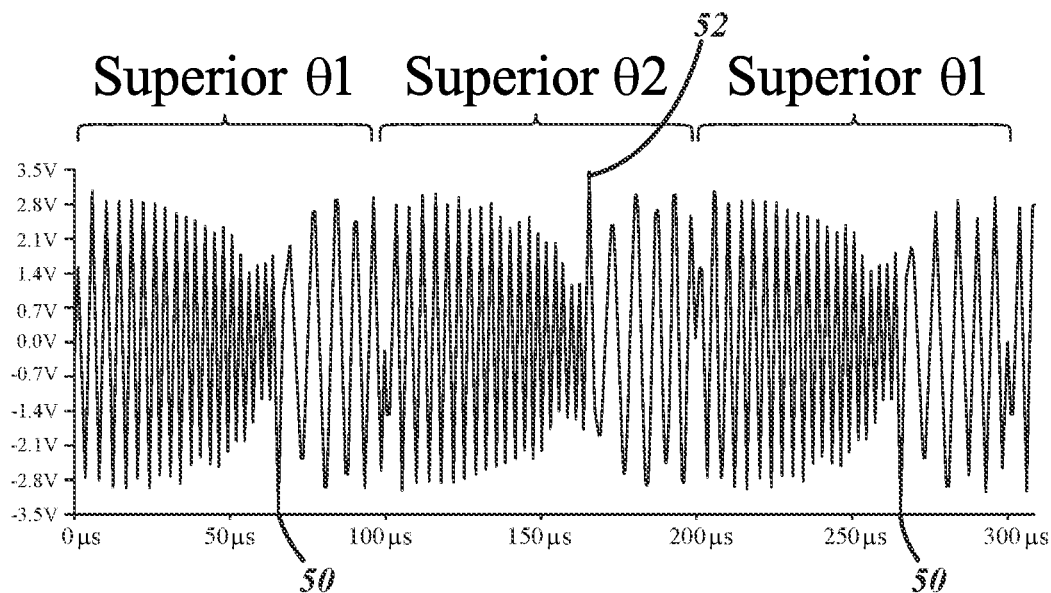
FIGS. 4A-D are timing diagrams showing waveforms for various signals in the system for demodulating and decoding the data body in a message transmitted along the power line within the vehicle shown in FIG. 3.

Peak detector circuit 40 is configured to detect selected amplitude peaks in the data body of the message received through amplifier 38. As noted hereinabove, the data body of the message is formed using Superior$\theta$1 (FIG. 2A) and Superior$\theta$2 (FIG. 2B) logic symbols. Referring to FIG. 4A, each Superior$\theta$1 and Superior$\theta$2 logic symbol has a length of one hundred (100) microseconds ($\mu$s). Each Superior$\theta$1 and Superior$\theta$2 logic symbol has a generally sinusoidal waveform with an amplitude that varies between the start of the logic symbol and the end of the logic symbol. Each Superior$\theta$1 logic symbol further includes a distinctive negative peak 50 having a negative amplitude that represents the maximum possible negative amplitude among the Superior$\theta$1 and Superior$\theta$2 logic symbols and, therefore, within the data body of the message. Each Superior$\theta$2 logic symbol further includes a distinctive positive peak 52 having a positive amplitude that represents the maximum possible positive amplitude among the Superior$\theta$1 and Superior$\theta$2 logic symbols and, therefore, within the data body of the message. The distinctive negative and positive peaks 50, 52 occur at the same point in time (about sixty-six (66) microseconds ($\mu$s)) after the start of the logic symbol. Therefore, the distinctive negative and positive peaks 50, 52 in successive logic symbols occur one hundred (100) microseconds ($\mu$s) apart.

Figure 4B:
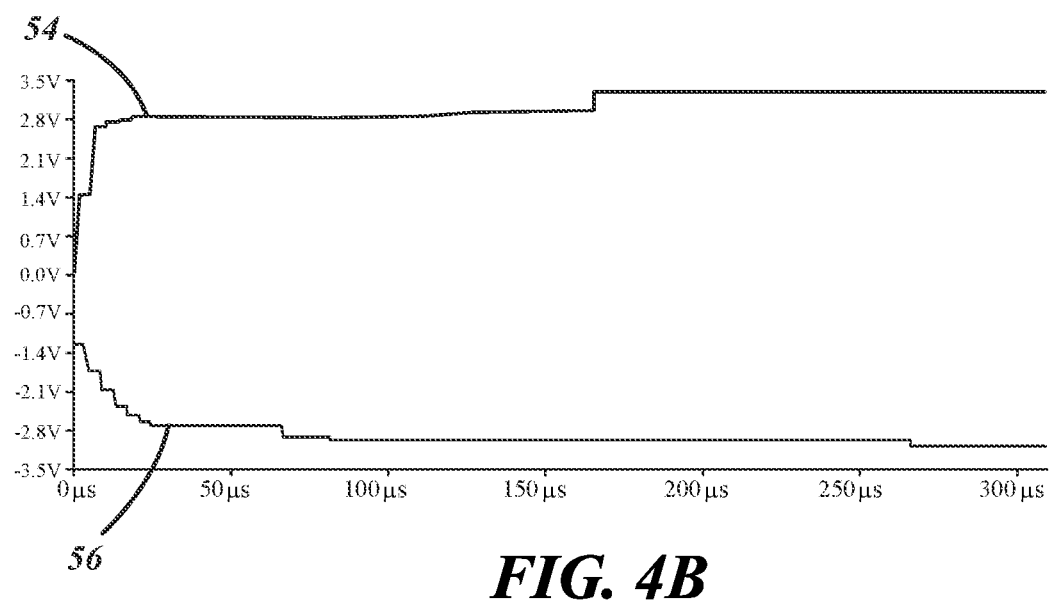

Referring to FIG. 4B, peak detector circuit 40 includes a negative peak detector circuit and a positive peak detector circuit that generates a pair of peak envelope signals 54, 56 outlining the extremes of the amplitude peaks in the data body. Signal 54 from the positive peak detector circuit tracks positive peaks in the data body. Referring to FIG. 4A-B, the waveform of the Superior$\theta$1 logic symbol includes a positive peak with a relatively large amplitude proximate the start of the Superior$\theta$1 logic symbol. Therefore, the value of signal 54 increases to a value corresponding to that peak. Thereafter, no positive peak has the same or greater positive amplitude until the distinctive positive peak 52 in the Superior$\theta$2 logic symbol at which point the value of signal 54 increases to a value corresponding to the peak 52. Signal 56 from the negative peak detector circuit tracks negative peaks within the data body. The waveform of the Superior$\theta$1 logic symbol includes a series of negative peaks having progressively increasing negative amplitudes proximate the start of the Superior$\theta$1 logic symbol. Therefore, the value of signal 56 increases (to a larger negative value) as each peak is reached. Thereafter, no negative peak has the same or greater negative amplitude until the distinctive negative peak 50 in the Superior$\theta$1 logic symbol at which point the value of signal 56 increases again to a value corresponding to the peak 50. Following each distinctive negative or positive peak 50, 52, some level of discharge will occur from the circuit component (e.g., a capacitor) providing an indication of the amplitude of the distinctive negative or positive peak 50, 52 such that the signals 56, 54, will provide an indication of each successive distinctive negative or positive peak 50, 52. The level discharge is insufficient, however, to allow the circuit to detect any peaks in the Superior$\theta$1 and Superior$\theta$2 logic symbols other than the distinctive negative and positive peaks 50, 52.

Figure 4C:
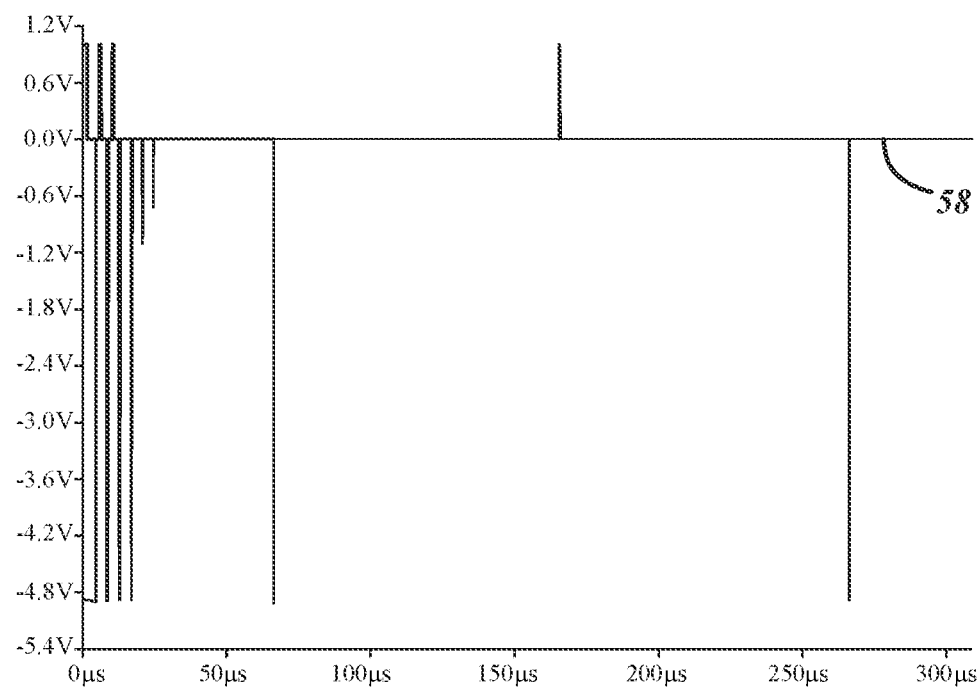

Referring now to FIG. 4C, peak detector circuit 40 is conjured to generate a peak indicator signal 58 responsive to the peak envelope signals 54, 56 shown in FIG. 4B. The peak indicator signal 58 indicates each increase in the peak envelope signals 54, 56. In particular, the peak indicator signal 58 assumes a first value each time the data body defines a positive peak having a positive amplitude equal to or greater than a previously identified largest positive amplitude in the data body. The peak indicator signal 58 assumes a second value each time the data body defines a negative peak having a negative amplitude equal to or greater than a previously identified largest negative amplitude in the data body.

Figure 4D:
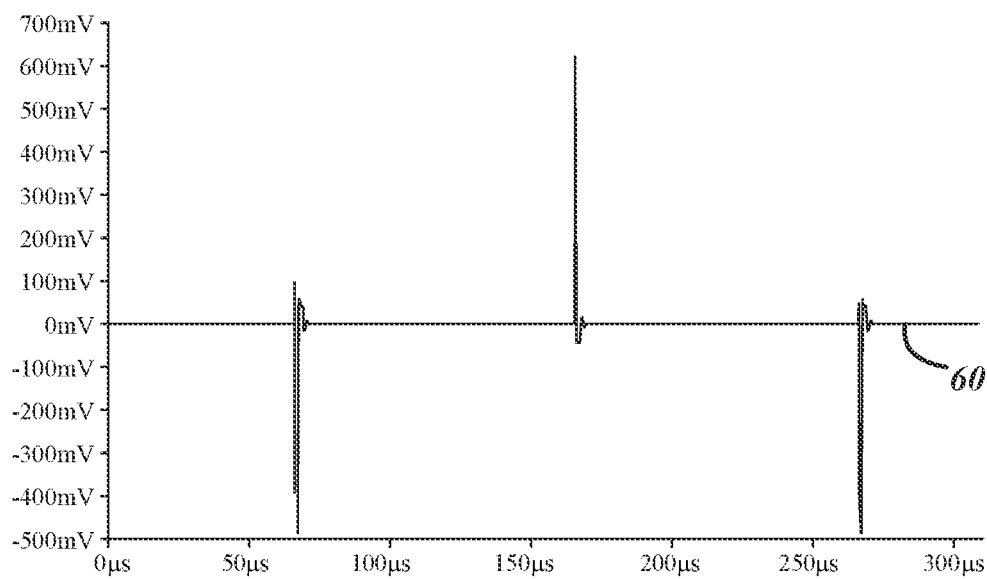

Referring again to FIG. 3, sampling circuit 42 is provided to extract data from the peak indicator signal 58 corresponding to the distinctive negative and positive peaks 50, 52 in the data body and thereby provide an indication of the presence of Superior$\theta$1 and Superior$\theta$2 logic symbols in the data body. Referring to FIG. 4D, sampling circuit 42 generates a data signal 60 responsive to the peak indicator signal 58 (FIG. 4C). Sampling circuit 42 ignores portions of the peak indicator signal 58 occurring prior to an indication in the peak indicator signal 58 of one of the distinctive negative or positive peaks 50, 52. Sampling circuit 42 may do so by combining a predefined masking signal with the peak indicator signal 58 to cancel those portions of the peak indicator signal 58 occurring prior to the first distinctive negative peak 50 or distinctive positive peak 52 in the peak indicator signal 58. Sampling circuit 42 may include a masking signal generator (not shown) for generating the masking signal and the masking signal generator may be triggered to generate the masking signal by an indication (e.g., a signal from controller 48) of the end of the preamble of the message. In one embodiment, the masking signal assumes a first predetermined value for a predetermined period of time. The predetermined period of time corresponds to a period of time prior to an occurrence of one of the distinctive negative or positive peaks 50, 52 in the data body. Thereafter, the masking signal assumes a second predetermined value. Because the Superior$\theta$1 and Superior$\theta$2 logic symbols have predefined waveforms, the masking signal can be precisely configured to cancel out the initial, unwanted portion of the peak indicator signal 58. In particular, the distinctive negative and positive peaks 50, 52 occur at approximately sixty-six (66) microseconds ($\mu$s) from the beginning of the corresponding logic symbol. Therefore, in one embodiment the masking signal can be configured to assume a value of logic zero for about sixty-six (66) microseconds ($\mu$s) and a value of logic one thereafter. When the masking signal is combined with the peak indicator signal 58 (e.g., through a circuit implementing an AND logic relationship), the masking signal will cancel the value of the peak indicator signal 58 (FIG. 4C) for the first sixty-six (66) microseconds ($\mu$s) and the data signal 60 (FIG. 4D) will not reflect the value of the peak indicator signal 58. Thereafter, however, the data signal 60 will correspond to the peak indicator signal 58 and therefore provide an indication of each logic symbol in the data body.

Referring again to FIG. 3, comparator 44 compares the data signal 60 generated by sampling circuit 42 to threshold values to generate a data bit pattern for controller 48. Comparator 44 may comprise a Schmitt trigger circuit. Comparator 44 is configured to generate an output signal that assumes one value indicative of the Superior$\theta$1 logic symbol when the value of the data signal 60 meets a predetermined condition relative to a predetermined negative threshold (e.g., is less than the predetermined negative threshold) and assumes another value indicative of the Superior$\theta$2 logic symbol when the value of the data signal 60 meets a predetermined condition relative to a predetermined positive threshold (e.g., is greater than the predetermined positive threshold).

Rectifier 46 converts the AC (alternating current) signal output by comparator 44 to a DC (direct current) signal. Rectifier 46 is conventional in the art.

Controller 48 is provided to decode received messages transmitted along power line 18 prior to transmission to controller 24 in which the data conveyed in the message is used or the command conveyed in the message is implemented. Controller 48 may comprise a programmable microprocessor or microcontroller or may comprise an application specific integrated circuit (ASIC). Controller 48 may include a memory 62 and a central processing unit (CPU) 64. Controller 48 may also include an input/output (I/O) interface 66 including a plurality of input/output pins or terminals through which controller 48 may receive a plurality of input signals and transmit a plurality of output signals. The input signals may include signals received from rectifier 46 while the output signals may include signals transmitted to controller 24 of system 20 or 22. In the illustrated embodiment, a single controller 48 is shown. It should be understood, however, that the functionality of controller 48 described herein may be divided among multiple sub-controllers.

A system 26 and method for demodulating and decoding the data body in a message transmitted along a power line 18 within a vehicle 10 in accordance the present teachings represent an improvement as compared to conventional systems and methods. In particular, the system 26 and method disclosed herein enable a vehicle 10 to receive messages along the power line 18 without use of the typical transceiver used within the industry that is in short supply and relatively expensive. The system 26 and method further allow demodulation and decoding of the data body independent of the duration of the preamble of the message, variations in the voltage range of the signal conveying the message and phase changes in the signal conveying the message. While the invention has been shown and described with reference to one or more particular embodiments thereof, it will be understood by those of skill in the art that various changes and modifications can be made without departing from the spirit and scope of the invention.

What is claimed is:

1. A system for demodulating and decoding a data body in a message transmitted along a power line within a vehicle, comprising:

a peak detector circuit configured to receive the data body in the message from the power line, the data body including first and second logic symbols, each of the first and second logic symbols varying in amplitude between a start of the logic symbol and an end of the logic symbol, the first logic symbol including a distinctive positive peak assuming a maximum positive amplitude for the data body and the second logic symbol including a distinctive negative peak assuming a maximum negative amplitude for the data body; and, generate a peak indicator signal that assumes a first value each time the data body defines a positive peak having a positive amplitude equal to or greater than a previously identified largest positive amplitude in the data body and a second value each time the data body defines a negative peak having a negative amplitude equal to or greater than a previously identified largest negative amplitude in the data body; and, a sampling circuit configured to generate a data signal responsive to the peak indicator signal, the sampling circuit ignoring portions of the peak indicator signal occurring prior to an indication in the peak indicator signal of one of the distinctive positive peak and the distinctive negative peak and the data signal assuming a first value each time the peak indicator signal indicates the distinctive positive peak and a second value each time the peak indicator signal indicates the distinctive negative peak.

2. The system of claim 1 wherein the sampling circuit is further configured to combine a masking signal and the peak indicator signal to cancel the portions of the peak indicator signal occurring prior to the indication in the peak indicator signal of one of the distinctive positive peak and the distinctive negative peak.

3. The system of claim 2 wherein the sampling circuit generates the masking signal in response to an end of a preamble of the message.

4. The system of claim 2 wherein the masking signal assumes a first predetermined value for a predetermined period of time corresponding to a period of time prior to an occurrence of one of the distinctive positive peak and the distinctive negative peak in the data body and a second predetermined value after the predetermined period of time.

5. The system of claim 4 wherein the first predetermined value is a logic zero and the second predetermined value is a logic one.

6. The system of claim 1, further comprising a comparator configured to generate an output signal assuming a first value indicative of the first logic symbol when a value of the data signal meets a first predetermined condition relative to a predetermined positive threshold and a second value indicative of the second logic symbol when the value of the data signal meets a second predetermined condition relative to a predetermined negative threshold.

7. The system of claim 1 wherein successive instances of a first distinctive positive peak or distinctive negative peak and a second distinctive positive peak or distinctive negative peak in the data body occur within a predetermined period of time.

8. The system of claim 1 wherein the distinctive positive peak occurs a predetermined period of time after the beginning of the first logic symbol and the distinctive negative peak occurs the predetermined period of time after the beginning of the second logic symbol.

9. The system of claim 1 wherein the data body of the message is encoded using chirp spread spectrum modulation.

10. The system of claim 1 wherein the first logic symbol is formed by a first waveform and the second logic symbol is formed by a second waveform that is 180 degrees out of phase with the first waveform.

11. A method for demodulating and decoding a data body in a message transmitted along a power line within a vehicle, comprising:

receiving the data body in the message from the power line, the data body including first and second logic symbols, each of the first and second logic symbols varying in amplitude between a start of the logic symbol and an end of the logic symbol, the first logic symbol including a distinctive positive peak assuming a maximum positive amplitude for the data body and the second logic symbol including a distinctive negative peak assuming a maximum negative amplitude for the data body;

generating a peak indicator signal that assumes a first value each time the data body defines a positive peak having a positive amplitude equal to or greater than a previously identified largest positive amplitude in the data body and a second value each time the data body defines a negative peak having a negative amplitude equal to or greater than a previously identified largest negative amplitude in the data body; and, generating a data signal responsive to the peak indicator signal while ignoring portions of the peak indicator signal occurring prior to an indication in the peak indicator signal of one of the distinctive positive peak and the distinctive negative peak, the data signal assuming a first value each time the peak indicator signal indicates a distinctive positive peak and a second value each time the peak indicator signal indicates a distinctive negative peak.

12. The method of claim 11 wherein generating the data signal includes combining a masking signal and the peak indicator signal to cancel the portions of the peak indicator signal occurring prior to the indication in the peak indicator signal of one of the distinctive positive peak and the distinctive negative peak.

13. The method of claim 12 wherein generating the data signal includes generating the masking signal in response to an end of a preamble of the message.

14. The method of claim 12 wherein the masking signal assumes a first predetermined value for a predetermined period of time corresponding to a period of time prior to an occurrence of one of the distinctive positive peak and the distinctive negative peak in the data body and a second predetermined value after the predetermined period of time.

15. The method of claim 14 wherein the first predetermined value is a logic zero and the second predetermined value is a logic one.

16. The method of claim 11, further comprising generating an output signal assuming a first value indicative of the first logic symbol when a value of the data signal meets a first predetermined condition relative to a predetermined positive threshold and a second value indicative of the second logic symbol when the value of the data signal meets a second predetermined condition relative to a predetermined negative threshold.

17. The method of claim 11 wherein successive instances of a first distinctive positive peak or distinctive negative peak and a second distinctive positive peak or distinctive negative peak in the data body occur within a predetermined period of time.

18. The method of claim 11 wherein the distinctive positive peak occurs a predetermined period of time after the beginning of the first logic symbol and the distinctive negative peak occurs the predetermined period of time after the beginning of the second logic symbol.

19. The method of claim 11 wherein the data body of the message is encoded using chirp spread spectrum modulation.

20. The method of claim 11 wherein the first logic symbol is formed by a first waveform and the second logic symbol is formed by a second waveform that is 180 degrees out of phase with the first waveform.

* * * * *